United States Patent
Wang et al.

(10) Patent No.: US 8,641,944 B2
(45) Date of Patent: Feb. 4, 2014

(54) SYNTHETIC YARN

(76) Inventors: Oliver Wang, Millbrae, CA (US); Wu Hsiu Tien, Taipei (TW)

( * ) Notice: Subject to any disclaimer, the term of this patent is extended or adjusted under 35 U.S.C. 154(b) by 1045 days.

(21) Appl. No.: 12/655,101

(22) Filed: Dec. 23, 2009

(65) Prior Publication Data

US 2011/0151257 A1 Jun. 23, 2011

(51) Int. Cl.
*D01D 5/253* (2006.01)
*D02G 3/32* (2006.01)

(52) U.S. Cl.
USPC ............... 264/51; 264/177.13; 264/177.16

(58) Field of Classification Search
USPC ............... 264/45.9, 46.1, 51, 177.1, 177.13, 264/177.16
See application file for complete search history.

(56) References Cited

U.S. PATENT DOCUMENTS

| | | |
|---|---|---|
| 2,152,826 A | 4/1939 | Spencer |
| 2,279,625 A | 4/1942 | Lancaster |
| 2,816,349 A | 12/1957 | Pamm |
| 3,023,483 A | 3/1962 | Steiner |
| 3,164,947 A | 1/1965 | Gaston |
| 3,251,728 A * | 5/1966 | Humbert et al. ............ 264/51 X |
| 3,411,979 A * | 11/1968 | Lewis, Jr. ............ 264/54 X |
| 3,470,685 A | 10/1969 | Hall |
| 3,720,572 A * | 3/1973 | Soda et al. ............ 264/51 X |
| 3,726,079 A | 4/1973 | Feild |
| 4,041,689 A | 8/1977 | Duncan et al. |
| 4,073,988 A | 2/1978 | Nishidi et al. |
| 4,179,875 A | 12/1979 | Gibbon |
| 4,216,264 A | 8/1980 | Naruse et al. |
| 4,420,534 A | 12/1983 | Matsui et al. |
| 4,423,539 A | 1/1984 | Invanhoe |
| D314,438 S | 2/1991 | Meyers |
| D328,140 S | 7/1992 | Ahlstrom |
| D381,120 S | 7/1997 | Barker |
| 5,651,481 A | 7/1997 | Jensen |
| 5,704,690 A | 1/1998 | Schwartz |
| D395,171 S | 6/1998 | Schwartz |
| 5,807,793 A | 9/1998 | Scari |
| 5,831,948 A | 11/1998 | Suzuki |
| 5,845,970 A | 12/1998 | Schwartz |
| D409,001 S | 5/1999 | Schwartz |
| D412,142 S | 7/1999 | Dickie |
| 6,004,673 A | 12/1999 | Nishijima |

(Continued)

FOREIGN PATENT DOCUMENTS

| | | |
|---|---|---|
| CA | 2213951 | 8/2002 |
| CN | 1179932 A | 2/2004 |

(Continued)

*Primary Examiner* — Leo B Tentoni
(74) *Attorney, Agent, or Firm* — Williams Mullen

(57) ABSTRACT

A synthetic wicker yarn capable of simulating a rolled leaf style, while being adapted to facilitate weaving. The yarn has an extruded, elongated body fabricated from a blend of a plurality of foamed polymers. The body has a surface of a first color, an x-axis and y-axis along a cross-sectional portion of the elongated body, and a longitudinal z-axis along its length. The x-axis has a first effective diameter and the y-axis has a second effective diameter. The body includes at least two rounded, foamed polymer folds, which project transversely from the x-axis and run longitudinally along a portion of the body. These folds simulate the margins of a leaf wrapped into a roll. Between the folds is a substantially concave crease within the surface of the body, also oriented longitudinally. The effective diameters are configured to form a substantially elliptical cross section that is easy to weave.

7 Claims, 7 Drawing Sheets

(56) References Cited

U.S. PATENT DOCUMENTS

| | | |
|---|---|---|
| D424,217 S | 5/2000 | Beachy |
| 6,094,769 A | 8/2000 | Driesen et al. |
| 6,174,602 B1 | 1/2001 | Matsui et al. |
| 6,179,382 B1 | 1/2001 | Schwartz |
| 6,340,525 B1 | 1/2002 | Akamatsu |
| 6,371,751 B1 | 4/2002 | Aneja |
| 6,413,631 B1 | 7/2002 | Alston |
| 6,444,312 B1 | 9/2002 | Dugan |
| 6,551,689 B1 | 4/2003 | Provost |
| D474,614 S | 5/2003 | Schwartz |
| D474,641 S | 5/2003 | Koopman |
| 6,625,970 B2 | 9/2003 | Schwartz |
| 6,663,809 B1 | 12/2003 | Haddock |
| 6,705,070 B2 | 3/2004 | Schwartz |
| D489,138 S | 4/2004 | Tyson |
| 6,725,640 B2 | 4/2004 | Schwartz |
| 6,783,842 B2 | 8/2004 | Niepelt |
| 6,848,248 B2 | 2/2005 | Schwartz |
| 6,935,383 B2 | 8/2005 | Schwartz |
| D521,252 S | 5/2006 | Hou |
| 7,060,354 B2 | 6/2006 | Baillie |
| 7,076,939 B2 | 7/2006 | Schwartz |
| 7,089,725 B2 | 8/2006 | Schwartz |
| D535,108 S | 1/2007 | Ping Sheng |
| D536,537 S | 2/2007 | Ping Sheng |
| D536,538 S | 2/2007 | Ping Sheng |
| 7,175,235 B2 | 2/2007 | Schwartz |
| 7,185,167 B2 | 2/2007 | Sollich |
| D539,550 S | 4/2007 | Ping Sheng |
| D564,240 S | 3/2008 | Poo |
| D590,602 S | 4/2009 | Poo |
| D593,332 S | 6/2009 | Wang |
| D599,561 S | 9/2009 | Wang |
| D620,085 S | 7/2010 | Okada |
| 2003/0209002 A1 | 11/2003 | Lancaster |
| 2004/0166314 A1 | 8/2004 | Mathis |
| 2005/0103396 A1 | 5/2005 | Schwartz |
| 2005/0106966 A1 | 5/2005 | Schwartz |
| 2005/0106974 A1 | 5/2005 | Schwartz |
| 2005/0106975 A1 | 5/2005 | Schwartz |
| 2005/0191923 A1 | 9/2005 | Schwartz |
| 2006/0021668 A1 | 2/2006 | Schwartz et al. |
| 2006/0099867 A1 | 5/2006 | Schwartz et al. |
| 2006/0116041 A1 | 6/2006 | Hou |
| 2006/0225399 A1 | 10/2006 | Schwartz |
| 2006/0225400 A1 | 10/2006 | Schwartz |
| 2007/0113956 A1 | 5/2007 | Schwartz et al. |
| 2008/0238176 A1 | 10/2008 | Wang |
| 2008/0292842 A1 | 11/2008 | Zuberi et al. |
| 2008/0300691 A1 | 12/2008 | Romero-Ortega et al. |
| 2009/0000216 A1 | 1/2009 | Kane et al. |

FOREIGN PATENT DOCUMENTS

| | | |
|---|---|---|
| CN | 1673449 A | 11/2004 |
| CN | 2791078 Y | 11/2004 |
| CN | 2804137 Y | 11/2004 |
| EP | 1533407 A2 | 10/2004 |
| JP | 60-045610 | 3/1985 |

* cited by examiner

SYNTHETIC YARN

FIELD OF THE INVENTION

The invention relates to the field of furniture constructed with synthetic woven material. More particularly, the invention relates to synthetic wicker yarns, woven panels made from such yarns, and furniture constructed from such panels. The invention also relates to methods for forming the yarns, panels, and furniture.

BACKGROUND OF THE INVENTION

Natural wicker has been used for many years for the manufacture of furniture, baskets, and other household goods. Natural wicker comes from pliant plant fibers; less pliant plants may be steamed or soaked in water to enhance pliability. Some plants, such as willow switches, may be used in the form of the entire stalk. Fibers such as cane or rattan are often used after peeling the outer skin to reveal the core or inner cane. There are various types of cane or rattan, such as Manau, Kooboo, Batang, etc. Other plants traditionally used are bamboo, water hyacinth, banana leaf, and reeds. Fibers may be drawn both from the stems and from leaves, depending on the plant. Wicker may then be woven into furniture, baskets, or other products. Wicker is generally lightweight, strong, and comfortable to sit or recline on.

Wicker is available in numerous styles and designs and may be woven in numerous different patterns and arrangements. For example, wicker may be twisted or untwisted, flat or round, and may include natural surface features, such as stripes and grooves. Of course, these styles may be mixed and matched in a particular weave pattern as designed based on the purpose and aesthetic requirements of the product being manufactured.

Natural wicker does have several drawbacks. After harvesting, natural wicker materials dry out, and may easily be damaged by precipitation, sun, and wind. Exposure to weather will deteriorate natural fibers over time. Attempts to waterproof natural wicker add an additional fabrication step, and are rarely successful. Natural wicker will soften when it absorbs moisture, accelerating wear. Excessive moisture could make the wicker susceptible to rot and mildew. In addition, some canes or other natural fibers have become scarce due to deforestation.

In recent years, synthetic wicker has been developed from various polymers and similar materials that have some of the look and feel of plant materials, but are not susceptible to the drawbacks of natural materials. The appearance of conventional synthetic wickers has generally been somewhat abstract, and dissimilar to the appearance of natural materials. Synthetic wicker yarns have generally been prepared by an extrusion process of a polymer through an extrusion die, which historically has produced a smooth, "plastic-like" appearance for the yarn.

An aspect of natural products is that there are organic variations in surface appearance, texture, splits, or coloration of the starting wicker yarn. For example, in some types of natural wicker, the shape or thickness of the natural leaf or stem affects the characteristics of the wicker yarn. Such natural characteristics are valued in the authentic appearance and texture of the finished wicker panel or article of furniture. The abstract features of conventional synthetic wicker yarns may have some effect when seen from a distance, but they still can appear artificial when seen closer up. Even features such as a variable cross section, grooves, or stripes may lack the appearance of equivalent natural materials. Further, when touched, these abstract features do not simulate the organic feel of the surface of natural fibers. Of course, the abstract features of conventional synthetic wicker yarns are less effective for larger synthetic wicker yarns.

A synthetic wicker yarn simulating the features of organic yarn material would enhance the appearance and feel of finished wicker items.

SUMMARY OF THE INVENTION

The invention relates to synthetic wicker yarns, woven panels made from such yarns, and furniture constructed from such panels. The invention also relates to methods for forming the yarns, panels, and furniture.

An aspect of the synthetic rolled leaf wicker yarn is an extruded, elongated body comprising a blend of a plurality of foamed polymers, the elongated body having a surface comprising a first color. The body has an x-axis and y-axis along a cross-sectional portion or profile of the elongated body, with a longitudinal z-axis along the length of the elongated body. The x-axis would thus have a first effective diameter and the y-axis having a second effective diameter. The elongated body may have at least two rounded, foamed polymer folds which transversely project from the x-axis and are substantially oriented longitudinally along a portion of the length of the elongated body. Each of the folds may simulate margins of a leaf wrapped into a roll to form the elliptical cross-section of the elongated body. The at least two folds define at least one substantially concave crease within the surface of the body between the folds, which are oriented longitudinally along the length of the elongated body. The first effective diameter may be greater than the second effective diameter to form a substantially elliptical cross section. At least a portion of the surface may have an embossed pattern of substantially round surface depressions, which are distributed in a substantially asymmetric pattern to simulate a punctate surface of a leaf.

Optionally, an embodiment of this wicker yarn may have a pattern of spots of a second color on the surface of the body distributed in a substantially asymmetric pattern. The plurality of foamed polymers may be at least one elastomeric polymer and at least one thermoplastic polymer. In one embodiment, the plurality of polymers may include EVA and PE. In another embodiment, the plurality of polymers consists essentially of EVA, PE, and PP. In one embodiment, the plurality of polymers may include about 40-60% EVA, about 30-50% PE, and about 0-20% PP. An embodiment of the present invention extends to articles of furniture made with the wicker yarn in the foregoing embodiments.

Another aspect of the synthetic rolled leaf wicker yarn is an extruded elongated body formed of a blend of a plurality of foamed polymers, where the plurality of polymers includes at least one elastomeric polymer and at least one thermoplastic polymer. The body has a substantially elliptical cross section with a surface of a first color. A longitudinal z-axis extends along the length of the elongated body. The elongated body includes at least two rounded, transversely projecting foamed polymer folds substantially oriented longitudinally substantially along the z-axis. Each of the folds simulates the margins of a leaf wrapped into a roll to form the elliptical cross-section of the elongated body. In addition, the at least two folds further define at least one substantially concave crease within the surface of the body between the folds, oriented longitudinally substantially along the z-axis.

Optionally, at least a portion of the surface may have an embossed pattern of substantially round surface depressions distributed in a substantially asymmetric pattern to simulate a punctate surface of a leaf. In another embodiment, the wicker yarn may include a pattern of spots of a second color on the surface of the body, which are distributed in a substantially asymmetric pattern. The plurality of foamed polymers may be at least one elastomeric polymer and at least one thermoplastic polymer. In one embodiment, the plurality of polymers may include EVA and PE. In another embodiment, the plurality of polymers consists essentially of EVA, PE, and PP. In one embodiment, the plurality of polymers may include about 40-60% EVA, about 30-50% PE, and about 0-20% PP. An embodiment of the present invention extends to articles of furniture made with the wicker yarn in the foregoing embodiments.

An aspect of an embodiment is a synthetic rolled leaf wicker yarn having an elongated body comprising an extrusion blend of a plurality of foamed polymers, the plurality of polymers comprising EVA, PE, and PP. The elongated body may have a substantially elliptical cross-section, variable within the limits of representing real wicker yarn, a surface having a first color, and a longitudinal z-axis along a length of the elongated body. The elongated body may have at least two rounded, transversely projecting foamed polymer folds substantially oriented longitudinally along a portion of the length of the body. Each of the folds simulates margins of a leaf wrapped into a roll to form the elliptical cross-section of the body. In addition, the at least two folds further define at least one substantially concave crease within the surface of the body between the folds, oriented longitudinally along the z-axis.

Optionally, at least a portion of the surface may have an embossed pattern of round surface depressions distributed in a substantially asymmetric pattern to simulate a punctate surface of a leaf. In another embodiment, the wicker yarn may include a pattern of spots of a second color on the surface of the body, which are distributed in a substantially asymmetric pattern. The plurality of foamed polymers may be at least one elastomeric polymer and at least one thermoplastic polymer. In one embodiment, the plurality of polymers may include EVA and PE. In another embodiment, the plurality of polymers consists essentially of EVA, PE, and PP. In one embodiment, the plurality of polymers may include about 40-60% EVA, about 30-50% PE, and about 0-20% PP. An embodiment of the present invention extends to articles of furniture made with the wicker yarn in the foregoing embodiments.

Another aspect of the invention is a method for manufacturing a synthetic rolled leaf wicker yarn. This method involves the steps of (a) blending a plurality of polymers, wherein the plurality of polymers comprises at least one elastomeric polymer and at least one thermoplastic polymer to form a composition; (b) adding a foaming agent to the composition; (c) extruding and heating the composition through a die into an extruded elongated body, the body having a generally elliptical cross-section, variable within the limits of representing real wicker yarn, a surface of a first color, and a longitudinal z-axis along a length of the elongated body; (d) permitting the extrudate to foam; (e) cooling the elongated body; and (f) wherein, the elongated body has at least two rounded, transversely projecting foamed polymer folds substantially oriented longitudinally along the length of the body, each simulating margins of a leaf wrapped into a roll to form the elliptical cross-section of the body; the at least two folds further defining at least one substantially concave crease within the surface of the body between the folds, oriented longitudinally along the length of the body.

Optionally, this method may further involve the steps of calendering the extrudate. In some embodiments, the plurality of polymers may include EVA and PE. In other embodiments, the plurality of polymer may include EVA, PE, and PP. In some cases, the plurality of polymers may include about 40-60% EVA, about 30-50% PE, and about 0-20% PP.

BRIEF DESCRIPTION OF THE DRAWINGS

The invention will be better understood in relation to the attached drawings illustrating preferred embodiments, wherein.

DETAILED DESCRIPTION OF THE PREFERRED EMBODIMENT

The invention relates to a synthetic yarn having certain advantageous features, and that effectively simulate yarn fabricated from organic materials.

As used herein, reference to a "yarn" refers to the complete wicker yarn used for creating or weaving woven wicker panels and the like.

Figure 1:
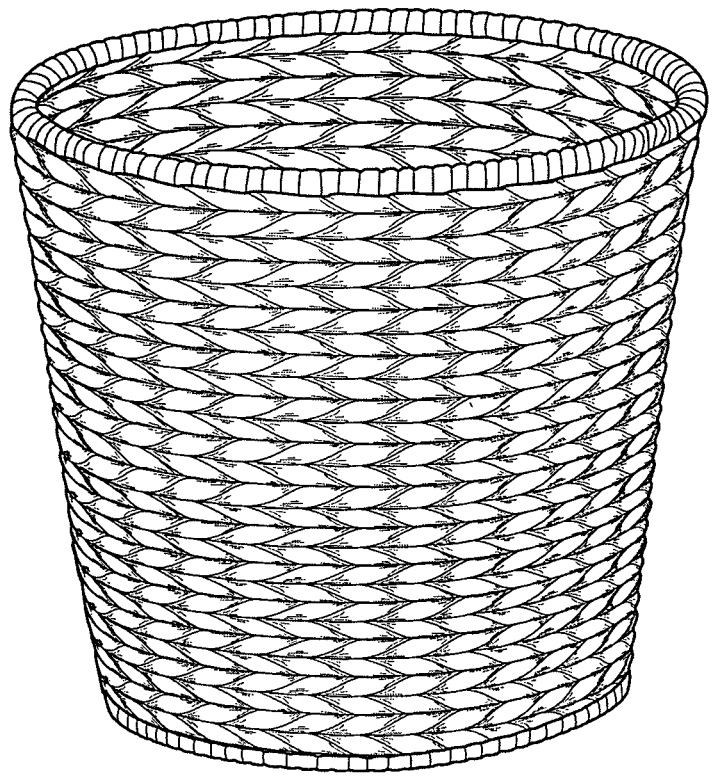
FIG. 1 is a view of a wicker basket fabricated with natural rolled leaf wicker yarn.

Some natural wicker yarns are produced using broad plant fibers, such as banana leaves, abaca, etc. The leaves may be twisted, plaited, or rolled into a yarn. Some plant fibers or leaves are rolled or twisted into a single roll or fold yarn. Others are rolled or twisted from two sides of leaf, which can produce a concave crease or seam between the two (i.e. "dual") rolled folds. The rolled folds form rounded projections running along the length of the yarn, depending on the level of twisting of the fiber during processing and the thickness desired. In general, wicker yarns fabricated from broad plant fibers can produce a distinctive appearance when woven into panels, furniture, or other items, coupled with a pleasing feel due to the broad, rounded projections. FIG. 1 is an illustration of a basket woven from a natural rolled broad leaf wicker yarn.

As noted above, simulating actual natural wicker yarns with synthetic materials heretofore has been difficult. Natural yarns that are fabricated from rolled, broad leaf fibers are generally larger in cross section than other wickers, such as rattan. For example, a typical cross sectional diameter of rolled banana leaf yarn might easily exceed 6 cm, whereas in contrast the diameter of raw, larger types of batang might reach about 36 mm, or only 6 mm for sea grass. Simulating such wicker yarns in the past resulted in heavier synthetic materials due to this larger diameter, which have proven difficult to handle and weave.

An aspect of the present invention is a synthetic rolled leaf wicker yarn formed by an elongated polymer body that is manageable during weaving. Preferably, an aspect of the synthetic yarn is a generally elliptical cross section, variable within the limits of representing real wicker yarn. The body defines at least one substantially concave crease in the surface of the body, oriented along its length, with the at least one concave crease being defined by at least two rounded and substantially parallel folds or transverse projections proximate to and separated by the crease. The folds or projections run along the length of the body, simulating the margins of a leaf wrapped into two rolls.

As described above, such a large width for the diameter of a round cross section synthetic yarn would be difficult to weave for many polymers. An elliptical cross section, however, means that a yarn may have a width or effective diameter in one direction (i.e., a minor or y-axis) that is less than the width or effective diameter in the other direction (i.e., the major or x-axis), giving the cross section a degree of eccentricity. For example, such irregular elliptical cross sectional shapes may include, but are not limited to, substantially heart-shaped or substantially kidney-bean shaped. The phrase effective diameter is intended to communicate that even with an irregular form or cross section, the yarn includes structure operable for such a relationship of diameters. For a synthetic rolled leaf yarn with two folds, the longer width along the major or x-axis may be, for example, 6-9 cm, while the shorter width measured from the crease of the minor or y-axis might be only 3-4 cm. This shorter dimension enables manipulation or bending of the synthetic yarn along the shorter minor axis, even though the yarn may be less flexible along the longer major axis. Thus, a generally elliptical cross section enables simulation of rolled broad leaf wicker, while also permitting weaving of the synthetic yarn due to the greater flexibility of the yarn about the minor axis. With such a convention as the x-axis denoting the major axis and the y-axis denoting the minor axis, then a z-axis denotes a longitudinal axis along the length of the wicker.

Figure 2:
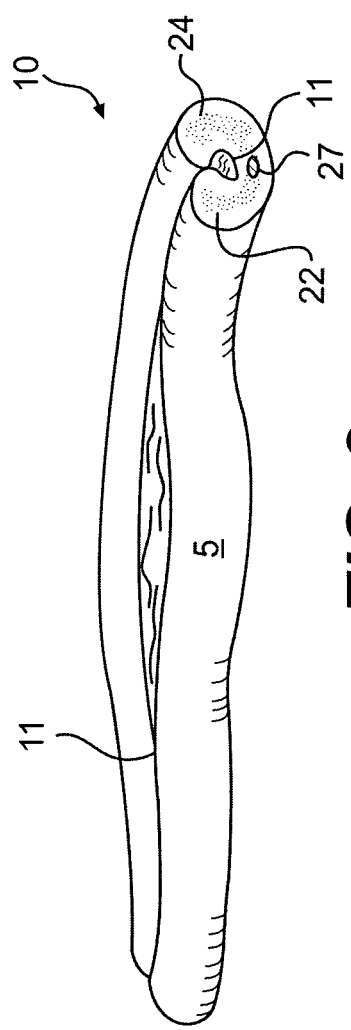
FIG. 2 is a perspective view of an embodiment of the synthetic wicker yarn.

Referring to the drawings, FIG. 2 shows an embodiment of the present invention. In this example, the yarn 10 has a substantially elliptical cross section and a crease 11 running along the length of the yarn 10. The cross section may be variable within the limits of representing real wicker yarn, as desired. Folds 22, 24 are shown as rounded transverse projections running longitudinally or along the length of the body of yarn 10. In this example, folds 22, 24 are shown as well developed or pronounced, so that they meet together across substantially concave crease 11 along portions of yarn 10. Crease 11 is generally oriented longitudinally along the body of yarn 10. In some portions of this embodiment of yarn 10, folds 22, 24 may separate, such that crease 11 becomes open and visible. However, some embodiments of yarn 10 may have no such separations exposing crease 11 or, conversely, may be substantially separated over all or significant portions of its length.

Figure 4:
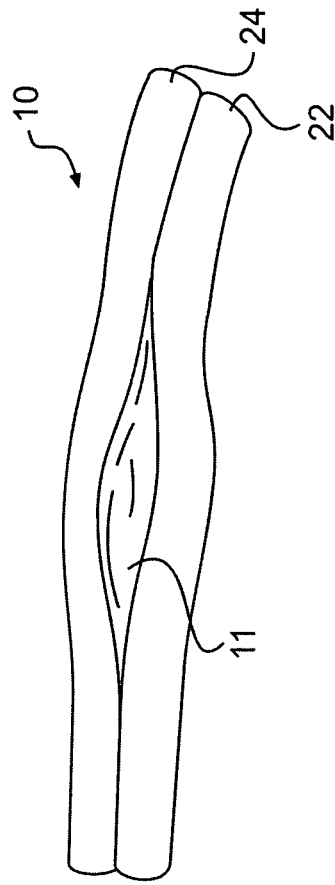
FIG. 4 is a top view of an embodiment of the synthetic wicker yarn.
Figure 3:
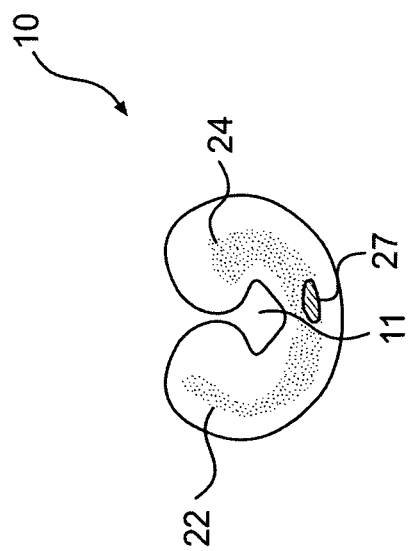
FIG. 3 is an end view of an embodiment of the synthetic wicker yarn.

As may be seen from the perspective view of FIG. 2, crease 11 and folds 22, 24 are structural features integral to the formation of the elliptical shape of the cross section of yarn 10, unlike conventional surface features of yarns, such as a groove or a stripe. FIG. 3 is an end view of the same embodiment of yarn 10 showing optional fiber reinforcing core 27 (e.g., polyester, nylon, etc.), while FIG. 4 is a top view showing crease 11. Thus, folds 22, 24 define crease 11 while creating a generally elliptical cross section.

Figure 6:
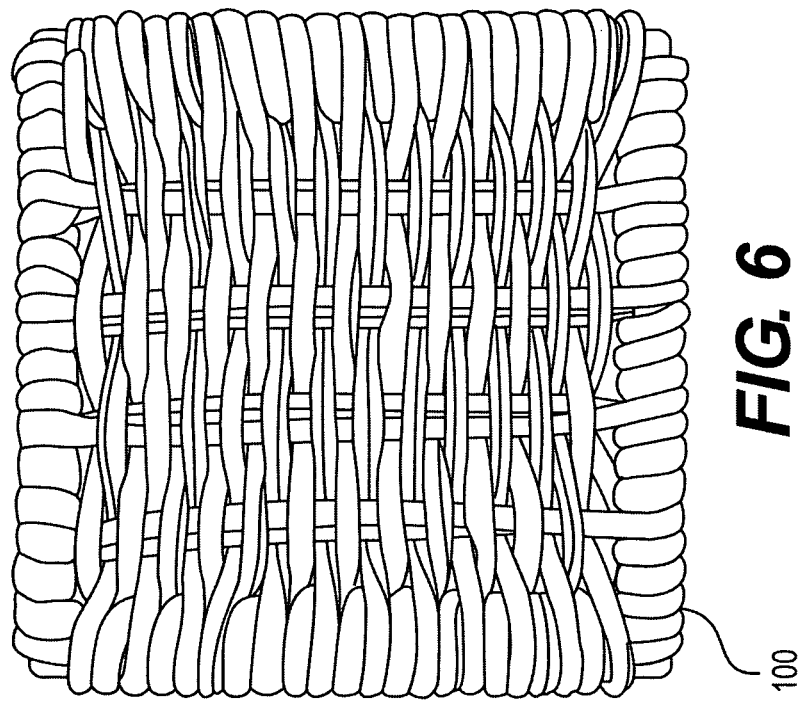
FIG. 6 is a reverse view of a panel woven using an embodiment of the synthetic wicker yarn.
Figure 5:
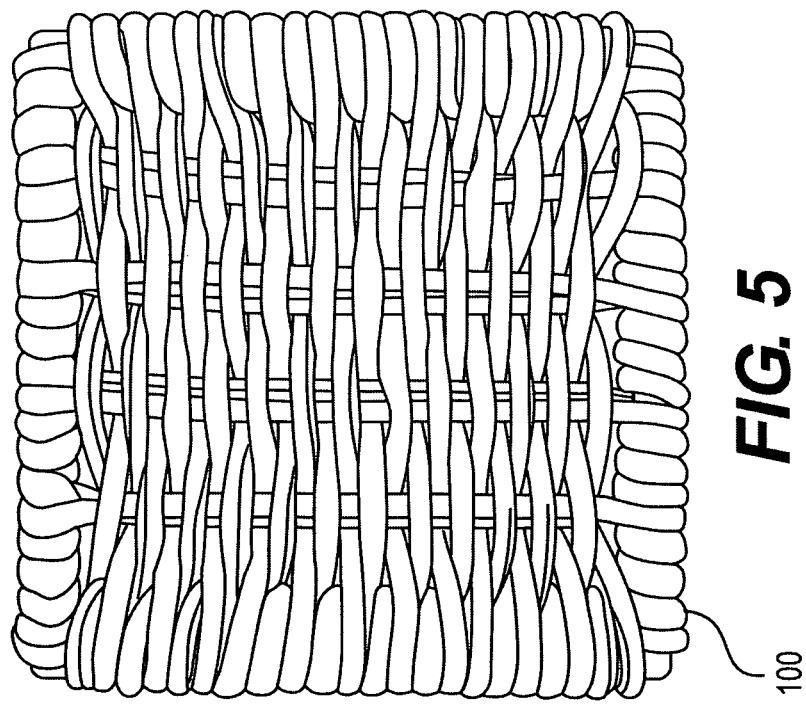
FIG. 5 is a front view of a panel woven using an embodiment of the synthetic wicker yarn.

FIG. 5 is a view of a panel 100 woven with an embodiment of yarn 10, while FIG. 6 is the opposing or reverse view of panel 100. Note the varying visibility of crease 11 within panel 100 for this embodiment of yarn 10.

Figure 7A:
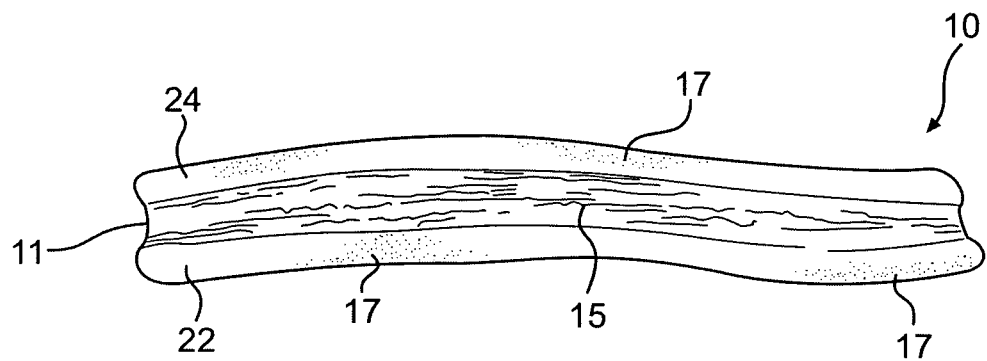
FIGS. 7A and 7B are top views of an alternative embodiment of the synthetic wicker yarn.
Figure 7B:
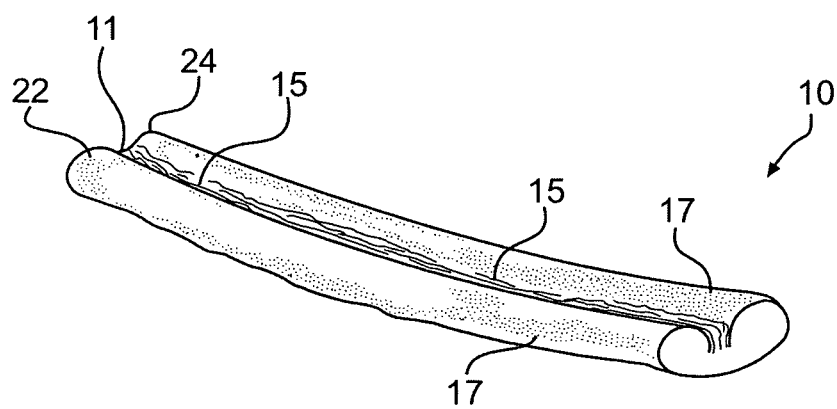

FIGS. 7A and 7B illustrate an embodiment in which yarn 10 has an elliptical cross section, but projecting folds 22, 24 are less pronounced. In this alternative embodiment, crease 11 can be more readily visible, as folds 22, 24 do not meet. Optionally, wrinkles 15 along the length of yarn 10 are provided within crease 11, which adds to the rolled leaf appearance and texture. Also shown are somewhat round surface depressions 17, distributed in a substantially asymmetric pattern to simulate a punctate surface of a dried leaf; depressions 17 also contribute to a pleasing and natural texture on the outer surface of yarn 10. As discussed below, depressions 17 may be provided by the use of a foaming polymer component within yarn 10.

An optional aspect of the synthetic rolled leaf wicker yarn is that the elongated body having a surface comprising a first color, may include a pattern of spots of a second color on the surface of the body distributed in a substantially asymmetric pattern.

Figure 8A:
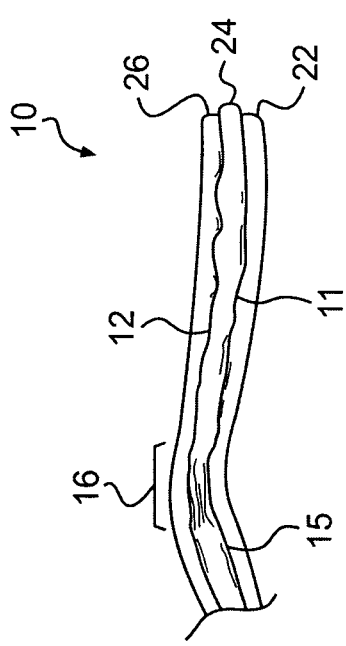
FIGS. 8A and 8B are perspective views of an alternative embodiment of the synthetic wicker yarn.
Figure 8B:
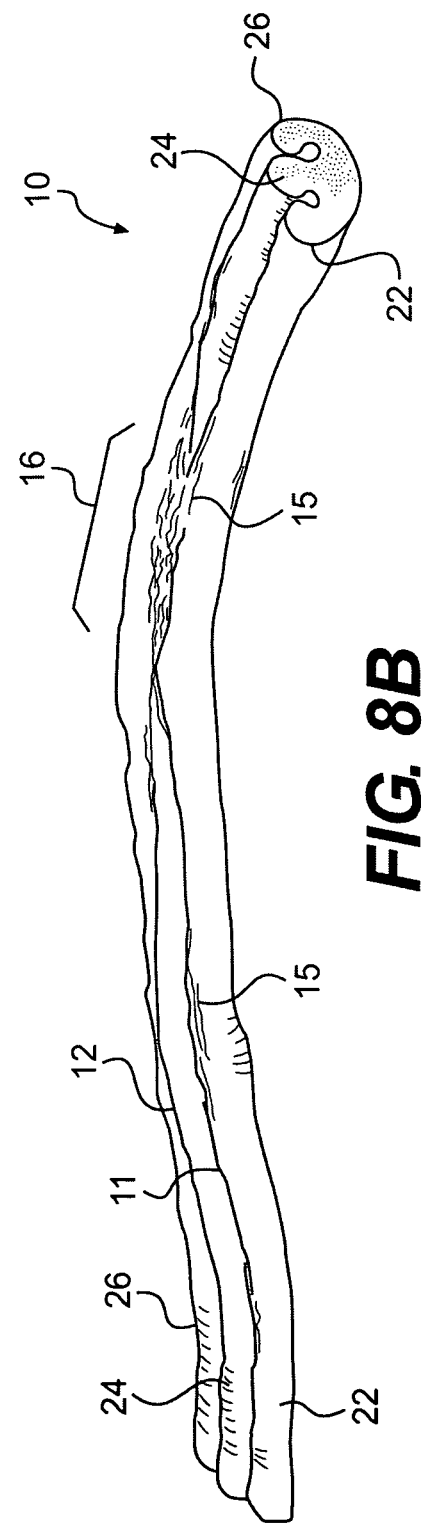

FIGS. 8A and 8B illustrate top views of an embodiment having multiple creases 11, 12, and multiple folds 22, 24, 26. Wrinkles 15 are optionally distributed along creases 11 and 12. As with natural broad leaf wickers, the folds define the crease perimeter. Thus, because two folds define a crease, there will generally be at least one fold more than the number of creases. For example, an embodiment having three folds could define two creases. Even with the additional structure, yarn 10 is able to provide an elliptical cross section because the interaction between creases and folds reduces the cross section width in one of the directions. Thus, a cross section of embodiments of yarn 10 having more than two folds is intended to fall within the definition of elliptical by such relational proportioning.

It is contemplated as an option that with internally situated folds, such as with FIGS. 8A & 8B, an internal fold 24 may, at some points along the length of yarn 10, temporarily cease to project, defining a discontinuity 16 or irregularity. In discontinuity 16, fold 24 converges with the rest of yarn 10 such that creases 11, 12, appear to merge into a single, larger crease. Such an optional irregularity, enabled by the choice of materials of fabrication, provides effective simulation of the variability in leaf rolls.

It has also been discovered that dual fold yarns having an elliptical cross section may be simulated effectively by use of certain polymer materials. An aspect of yarn 10 is that it is fabricated from a plurality of polymers conducive to forming the folded leaf profile discussed above. Yarn 10 of the present invention may be formed of any flexible and resilient polymer material suitable for such a purpose. The yarn 10 may also be comprised of a combination or blend of polymers exhibiting both elastomeric and thermoplastic characteristics to enable flexibility with such larger dimensions. For example, a foamed blend may include polyethylene (PE), ethylene-vinyl acetate copolymer (EVA), and/or polypropylene (PP). In one embodiment, the yarn 10 is composed of about 30-50% PE, about 40-60% EVA, and about 0-20% PP, and more specifically, may be composed of a blend comprising about 40% PE, about 50% EVA, and about 10% PP. Without intending to be bound to any particular theory, it is believed that the interaction of EVA with PE and PP produces an expanding shape after extrusion that culminates in folds and creases that effectively simulate the folds and creases of rolled natural leaves. It is also believed that PE and PP, without the addition of EVA, would not produce this beneficial appearance and texture. Additionally, it was shown that EVA alone would be unsuitable for this application.

In particular, it is considered that an EVA component of a foamed polymer blend may provide elastomeric characteristics, such as softness and flexibility. Given the larger diameters of some of the synthetic wickers contemplated by the present invention, this flexibility is useful for the weaving process. A PE component can provide strong wear resistance, chemical resistance and thermoplastic characteristics. PP is rugged, strong, and often somewhat stiffer than some other plastics to contribute rigidity and strength to the composition, as well as being economical. Of course, each of these components may be selected from a wide range of variables, such as weight percent of vinyl acetate in EVA, density, or additives.

Figure 9:
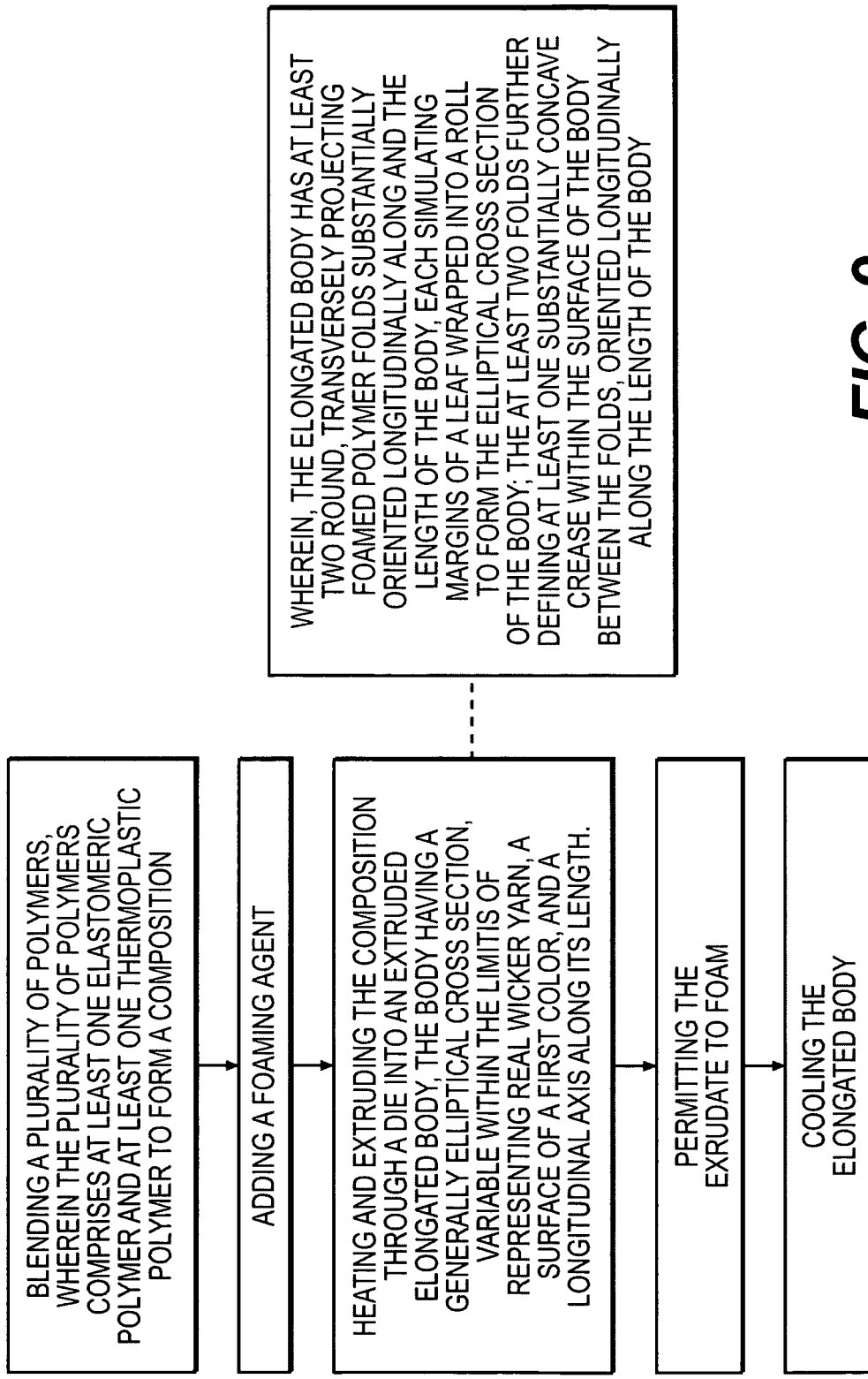
FIG. 9 is a flow chart of an embodiment of the method of manufacturing the synthetic yarn.

An aspect of a method of fabrication is shown in FIG. 9. Yarn 10 may be fabricated by providing a plurality of polymers, as discussed above, typically in granulated or pelletized forms of resin or polymer feed. The next step comprises blending or mixing the plurality of polymers or resins together. This blending may preferably be a dry mix, which can be performed with a desired extruder feed rate, such as 10 kg/hr. Alternatively, the polymers may be fluff blended or combined during a subsequent extrusion step. The polymers may then be melted during the process of extrusion. Of course, the melting temperature will vary with the polymers selected; however, 190-220° C. was effective for a blend of EVA, PE, and PP.

As noted above, preferably the plurality of polymers include foaming a thermoplastic and elastomer blend, such as EVA, PE, and PP. An aspect of consideration is the viscosity of the polymer blend for extrusion, in conjunction with the timing of the addition of a foaming agent, including the properties of such agent. Optionally, a lubricant may be added to improve viscosity if necessary. However, excessive viscosity can reduce the extrusion pressure at the die and permit premature nucleation of the foam, which is undesirable for the present application and may lead to loss of form. In addition, compatabilizing agents may be added to enhance blending of the polymers, depending on the application and composition.

The plurality of polymers may then be extruded with the output passed through a die. During extrusion, a desired foaming agent is added, whether as a chemically reactive modifier or a gaseous injection. With appropriate viscosity, the polymers will pass out the die with an initial die controlled cross section while maintaining a desired pressure within the extruder. However, after passing from the high pressure of the die restricted extruder, the foaming or nucleation will begin to modify the shape of the yarn. The extrudate at this point may be about 150-180° C. The extrudate may be passed through an optional roller or calender to assist in forming the substantially elliptical cross section. The rolled extrudate is then passed into a cooler, such as a water tank having a temperature of about 25-30° C. The foaming may then be set, subject to the changes caused by post extrusion foaming, rolling, and cooling.

Thus, the initial cross section of the extrudate can be controlled by the die. However, the foaming of the polymer expands and alters the cross section in irregular ways, which in combination with the crease and folds, gives the appearance of rolled natural leaf tissue.

Figure 10:
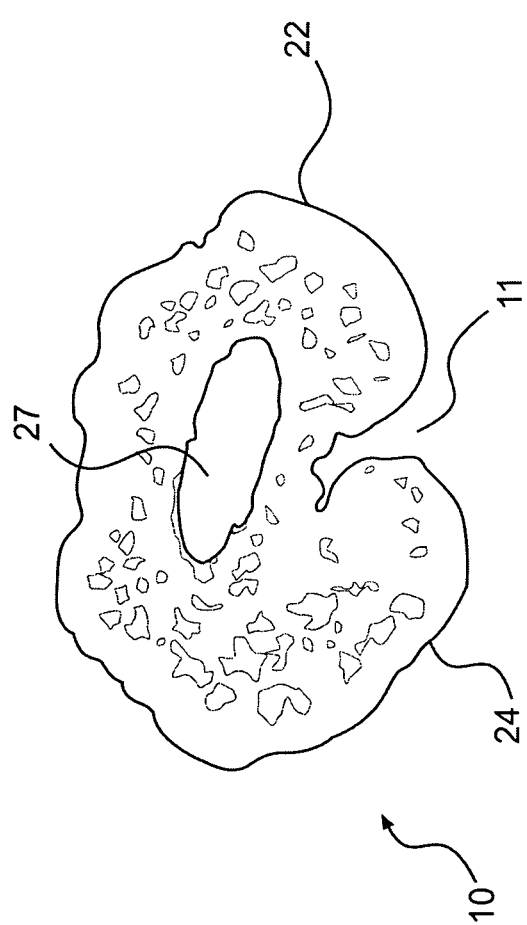
FIG. 10 is an end view of an embodiment of the synthetic yarn.

The foamed polymer blend also improves the surface characteristics of texture and luster. In general, EVA contributes to a soft texture, which is useful for a synthetic wicker yarn used in furniture. In particular, it has been found that the foamed polymer blend can produce an embossed effect visible in the irregular wrinkle(s) and crease(s). Open surface cells of the foamed blend create the somewhat round surface depressions 17 distributed in a substantially asymmetric pattern. This effect can simulate a punctate surface of a dried leaf and produce a naturally irregular texture, which is an optional aspect of embodiments of the synthetic wicker yarn. FIG. 10 is an end view of an embodiment having substantial cells from foaming.

Figure 11:
FIG. 11 is a side view of an embodiment of the synthetic yarn having a core.

Other aspects of the synthetic yarn may be employed to simulate the look and feel of natural rolled leaf wicker yarns. For example, the appearance may also be considered to include characteristics of color, luster, and texture. Color is simply the tint or chromatic characteristic of a yarn. The luster is the ability of the material to reflect light in a particular direction. Texture depends on the surface characteristic of the material. It is contemplated that an option of the present invention is natural variation in coloring along the length for embodiments of the synthetic wicker yarn. For example, an embodiment of synthetic yarn may include an irregular stripe along its length. Alternatively, an embodiment may include a plurality of spots of a second color on the surface of the yarn distributed in a substantially asymmetric pattern. As noted above, some embodiments of yarn may have a simulated punctate surface. In one embodiment, the surface depressions 17 of a punctate surface may be a second color, as shown in FIG. 7B. Conventional, smooth polymer yarns are often shiny or slick, reflecting light in an unnatural manner. A punctate surface may diffuse or redirect light and avoid the shiny appearance. Of course, a punctate surface may also improve texture, along with choice of material and macro features such as the crease or wrinkles. FIG. 11 is a view of an alternative embodiment having a fiber reinforcing core 27, which has been exposed by cutting away the yarn.

Thus, embodiments of the synthetic yarn described herein may effectively simulate natural yarn produced from broad leaf plant fibers, without the drawbacks of natural materials. The method of manufacturing has been shown to produce a foam polymer blend of fine cell size, with lower density, desirable shape, texture, and appearance. Aside from effective simulation, the polymer composition of the present invention provides additional benefits. For example, the foaming of this blend of polymers in the disclosed elliptical cross section reduces the overall weight of the yarn, yet retains the strength and toughness of non-foamed polymers. This can significantly reduce the weight of woven furniture, decreasing transportation expense. This is particularly relevant for the larger, rolled leaf yarns contemplated within the present invention.

The yarn 10 of the present invention may be woven into various materials, including articles of furniture such as chairs, couches, ottomans, tables, benches, stools and the like. An article of furniture may be produced by providing a frame into which the yarn of the present invention is interwoven. The resulting article made with the yarn of the present invention has the look and feel of natural wicker, but with the benefits of the synthetic wicker yarn.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method for manufacturing a synthetic rolled leaf wicker yarn, comprising the steps of:

(a) blending a plurality of polymers, wherein the plurality of polymers comprises at least one elastomeric polymer and at least one thermoplastic polymer to form a composition;
(b) adding a foaming agent to the composition;
(c) extruding and heating the composition through a die into an extruded elongated body, the body having a generally elliptical cross-section, variable within the limits of representing real wicker yarn, a surface of a first color, and a longitudinal z-axis along a length of the elongated body;
(d) permitting the extrudate to foam;
(e) cooling the elongated body; and
(f) wherein, the elongated body has at least two rounded, transversely projecting foamed polymer folds substantially oriented longitudinally along the length of the body, each simulating margins of a leaf wrapped into a roll to form the elliptical cross-section of the body; the at least two folds further defining at least one substantially concave crease within the surface of the body between the folds, oriented longitudinally along the length of the body, and the separation between the at least two folds increases along a first length of the z-axis to define an open region of the crease along the first length.

2. The method as claimed in claim 1, further comprising the step of calendering the extrudate.

3. The method as claimed in claim 1, wherein the plurality of polymers comprises EVA and PE.

4. The method as claimed in claim 1, wherein the plurality of polymer comprises EVA, PE, and PP.

5. The method as claimed in claim 1, wherein the plurality of polymer comprises about 40-60% EVA, about 30-50% PE, and about 0-20% PP.

6. The method as claimed in claim 1, further comprising a step of providing an embossed pattern of substantially round surface depressions distributed in a substantially asymmetric pattern to simulate a punctate surface of a leaf, on at least a portion of the surface.

7. The method as claimed in claim 1, further comprising a step of providing a pattern of spots of a second color on the surface distributed in a substantially asymmetric pattern.

\* \* \* \* \*